(12) United States Patent
Mehoudar (10) Patent No.: US 6,206,305 B1
(45) Date of Patent: *Mar. 27, 2001

(54) IRRIGATION EMITTER UNIT (75) Inventor: Raphael Mehoudar, Tel Aviv (IL)

(73) Assignee: Hydroplan Engineering Ltd., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 09/502,095

(22) Filed: Feb. 10, 2000

Related U.S. Application Data (63) Continuation of application No. 09/168,623, filed on Oct. 8, 1998, now Pat. No. 6,027,048.

(30) Foreign Application Priority Data

Oct. 14, 1997 (IL) .......................................... 121967

(51) Int. Cl.⁷ ..................................................... B05B 15/00
(52) U.S. Cl. ................. 239/542; 239/533.1; 239/533.13; 239/547; 239/571; 138/42
(58) Field of Search ................................ 239/462, 533.1, 239/533.13, 542, 547, 571, 575; 138/42–46

(56) References Cited

U.S. PATENT DOCUMENTS

| 4,105,162 | 8/1978 | Drori . |
|---|---|---|
| 4,210,287 | 7/1980 | Mehouder . |
| 4,392,616 | 7/1983 | Olson . |
| 4,728,042 | 3/1988 | Gorney et al. . |
| 5,203,503 | 4/1993 | Cohen . |
| 5,294,058 | 3/1994 | Einav . |
| 5,324,371 | 6/1994 | Mehoudar . |
| 5,400,973 | 3/1995 | Cohen . |
| 5,586,727 | 12/1996 | Shekalim . |
| 5,609,303 | 3/1997 | Cohen . |
| 5,615,838 | 4/1997 | Eckstein et al. . |
| 5,636,797 | 6/1997 | Cohen . |
| 6,027,048 | * 2/2000 | Mehouder ........................ 239/542 |

FOREIGN PATENT DOCUMENTS

| 467386 | 1/1992 | (EP) . |
|---|---|---|
| 0 659334 | 6/1995 | (EP) . |
| 2 366790 | 5/1978 | (FR) . |
| 2 468810 | 5/1981 | (FR) . |
| 2 043417 | 10/1980 | (GB) . |
| 79431 | 7/1986 | (IL) . |
| 106608 | 8/1993 | (IL) . |
| 91/14549 | 10/1991 | (WO) . |
| 92/05689 | 4/1992 | (WO) . |

* cited by examiner

Primary Examiner—Lesley D. Morris
Assistant Examiner—Steven J. Ganey
(74) Attorney, Agent, or Firm—Helfgott & Karas, P.C.

(57) ABSTRACT

An emitter unit to be integrally bonded to an internal surface of a conduit and comprising an elongated housing, a housing inlet adapted to communicate with an interior of said conduit and a housing outlet adapted to communicate with a conduit outlet. An elongated, flow-restricting flowpath is formed in the housing having a flowpath inlet communicating with the housing inlet and a flowpath outlet communicating with the housing outlet. A resiliently flexible membrane is mounted in the housing which is of closed box-like shape and is constituted by an elongated receiving member and a correspondingly elongated cover member. Projections and recesses are formed along the lengths of elongated rim portions of the members and are directed substantially transversely to longitudinal axes of said members such that projections of one member are adapted to form a close pressure fit within corresponding recesses of the other member.

28 Claims, 6 Drawing Sheets

IRRIGATION EMITTER UNIT

This application is a Continuation application of Ser. No. 09/168,623 filed on Oct. 8, 1998, now U.S. Pat. No. 6,027,048.

FIELD OF THE INVENTION

This invention relates to an improved irrigation emitter unit for use in a drip irrigation system. The invention is specifically applicable to such systems wherein the emitter units are integrally bonded at spaced-apart intervals to the inner surface of a conduit adjacent to outlet apertures in the conduit, so that an irrigation flow through the conduit results in a drip rate irrigation output from the individual emitter units via the outlets.

BACKGROUND OF THE INVENTION

Such drip irrigation systems and, in particular, emitter units for use therewith, have been known for some time. They involve the provision in the emitter of an elongated, flow-restricting flowpath through which water passes from the conduit so as to emerge from the conduit outlet as a substantially pressureless drip.

The construction and provision of this flow-restricting flowpath has in general fallen into two main categories, namely:

a) where the flowpath is entirely defined within an emitter housing; and b) where the flowpath is defined between the emitter housing and the surface of the conduit to which the housing, is bonded.

The present invention is specifically related to the first of these categories, i.e. where the flowpath is defined within the housing. Furthermore, the invention preferably relates to such an emitter unit which is provided with flow control means, e.g., differential pressure control means, designed to ensure that the output rate from the emitter is substantially independent of variations in the pressure of the irrigation supply flow to the emitter unit.

Such a drip irrigation system and, in particular, irrigation emitter units for use therewith, have been disclosed in our earlier U.S. Pat. No. 4,210,287 (hereinafter "the '287 patent"). The '287 patent discloses an emitter unit provided with a resiliently flexible membrane which is releasably retained within a body member so as to serve a double function, namely, on the one hand, whilst being exposed to the irrigation flow pressure in the conduit to serve in exercising differential pressure control, and, on the other hand, to define, with respect to a flow restricting groove formed in the body member, a flow-restricting flowpath.

There have also been previous proposals for enclosing the emitter unit in a housing. These proposals have not included adequate solutions, if at all, in connection with problems which arise regarding the possible assembly of the constituent elements of the housing.

Particular problems clearly arise where, as in the case of emitter units the subject of the present invention, relatively long, elongated emitter units are required and means have to be provided for the retention together of the constituent pieces of the container prior to its bonding to the conduit, especially when the container is formed of relatively pliable plastic material (e.g. polyethylene) so as to facilitate its ready bonding to the conduit.

It is therefore an object of the present invention to provide a new and improved irrigation emitter unit for use in drip irrigation systems, wherein the above-referred-to requirement is substantially achieved.

BRIEF SUMMARY OF THE INVENTION

According to the present invention, there is provided an emitter unit adapted to be integrally bonded to an internal surface of a conduit, comprising an elongated housing, a housing inlet adapted to communicate with an interior of said conduit; a housing outlet adapted to communicate with a conduit outlet; an elongated, flow-restricting flowpath formed in said housing; a flowpath inlet communicating with said housing inlet; a flowpath outlet communicating with said housing outlets; a resiliently flexible membrane mounted in said housing; said housing being of closed box-like shape and being constituted by an elongated receiving member and a correspondingly elongated cover member; and projection and recess interengaging means formed along the lengths of elongated rim portions of said members and directed substantially transversely to longitudinal axes of said members such that projection means of one member are adapted to form a close pressure fit within corresponding recess means of the other member.

The pressure fitting together of interengaging means located along the lengths of the rims of the constituent members of the housing ensures effective retention together of these members after their assembly together and effectively prevents their coming apart prior to the bonding of the housing to the conduit. This is of particular importance seeing that, on the one hand, the emitter units have to be stored after assembly and consequently subjected to mechanical handling during the bonding procedure and, on the other hand, the enclosed membrane has to be retained in the housing under a certain degree of resilient pressure.

By virtue of the possibility to provide relatively elongated emitter units of secure, box-like construction in accordance with the present invention, it is possible to achieve certain further additional advantages, among which may be mentioned (i) the provision of a plurality of superimposed interconnecting flow restricting flowpaths respectively separated by the membrane or additional membranes;

(ii) the incorporation in the emitter unit of an effective non-return valve structure; and (iii) the provision of extended filtering arrangements.

Preferably, the emitter unit is provided with differential pressure control means, in which case there is formed in the housing a recess having dimensions substantially extended as compared with the width of the flowpath, with a recess outlet formed in a base of the recess, a rim of the recess having an area substantially greater than the area of the recess outlet, a first surface of the membrane adapted to be exposed to fluid inflow pressure; a second and opposite surface of said membrane being juxtaposed to said rim and adapted to be pressed against said rim under said inflow pressure; and so as to define with said recess an outlet control chamber; the arrangement being such that when said fluid inflow pressure exceeds the fluid pressure in said outlet control chamber by a predetermined amount, the membrane flexes towards said recess outlet so as to define with the recess outlet a restricted outflow path.

Thus, there are preferably formed during the relatively simple molding of the constituent members of the housing, appropriate flow-restricting elongated grooves together with the outlet control chamber recess, these grooves and recess, together with the interposed membrane, defining the flow-restricting flowpaths and the outlet control chamber.

By virtue of the provision of the box-like housing, it is possible to provide, in the housing, in accordance with one aspect of the present invention, one or more elongated inflow channels located preferably adjacent one or both elongated edges of one of the constituent members of the housing. These channels communicate with the housing inlet and are exposed to the interior of the conduit.

These channels, which are also formed during the molding of one or other of the constituent members of the housing, are partially covered, thus facilitating the provision of a relatively restricted filtering type inlet into the channels and at the same time allowing for the provision of relatively widely dimensioned channels.

The channels are provided with an array of filter baffles located along the length thereof. In this way, irrigation flow passes into the emitter unit, alone one or more extended, open inflow channels provided with filtering means, and in this wave the inflow channel itself can be of relatively wide dimensions, thereby again restricting the dangers of blockage.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 3:
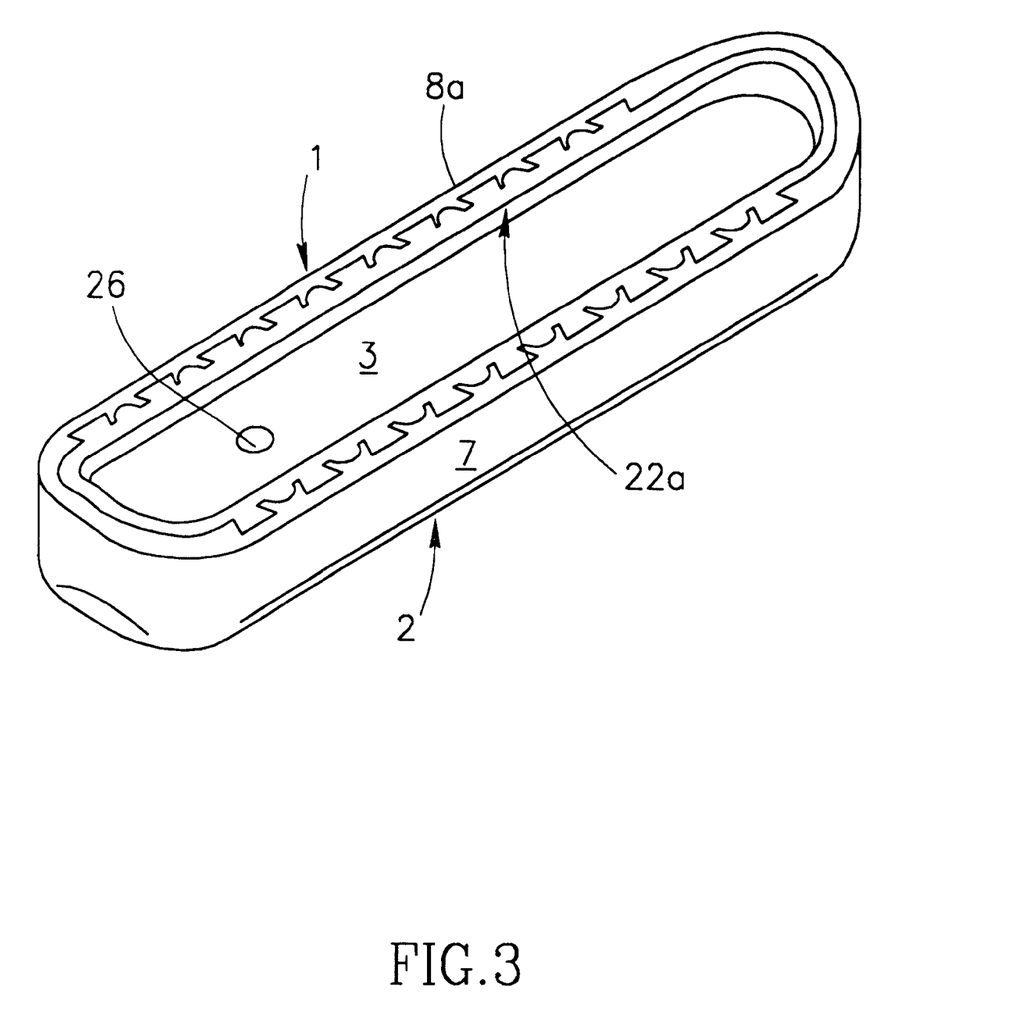
FIG. 3 is a perspective view of the assembled emitter unit in accordance with the present invention.

As seen in the drawings, the emitter unit in accordance with the invention comprises an elongated housing 1 (see FIG. 3) which is essentially of box-like, rectangular shape having rounded ends. The housing 1 is constituted by a correspondingly shaped elongated receiving member 2, a correspondingly shaped elongated cover member 3 and a correspondingly shaped elongated, resiliently flexible membrane 4.

Figure 1:
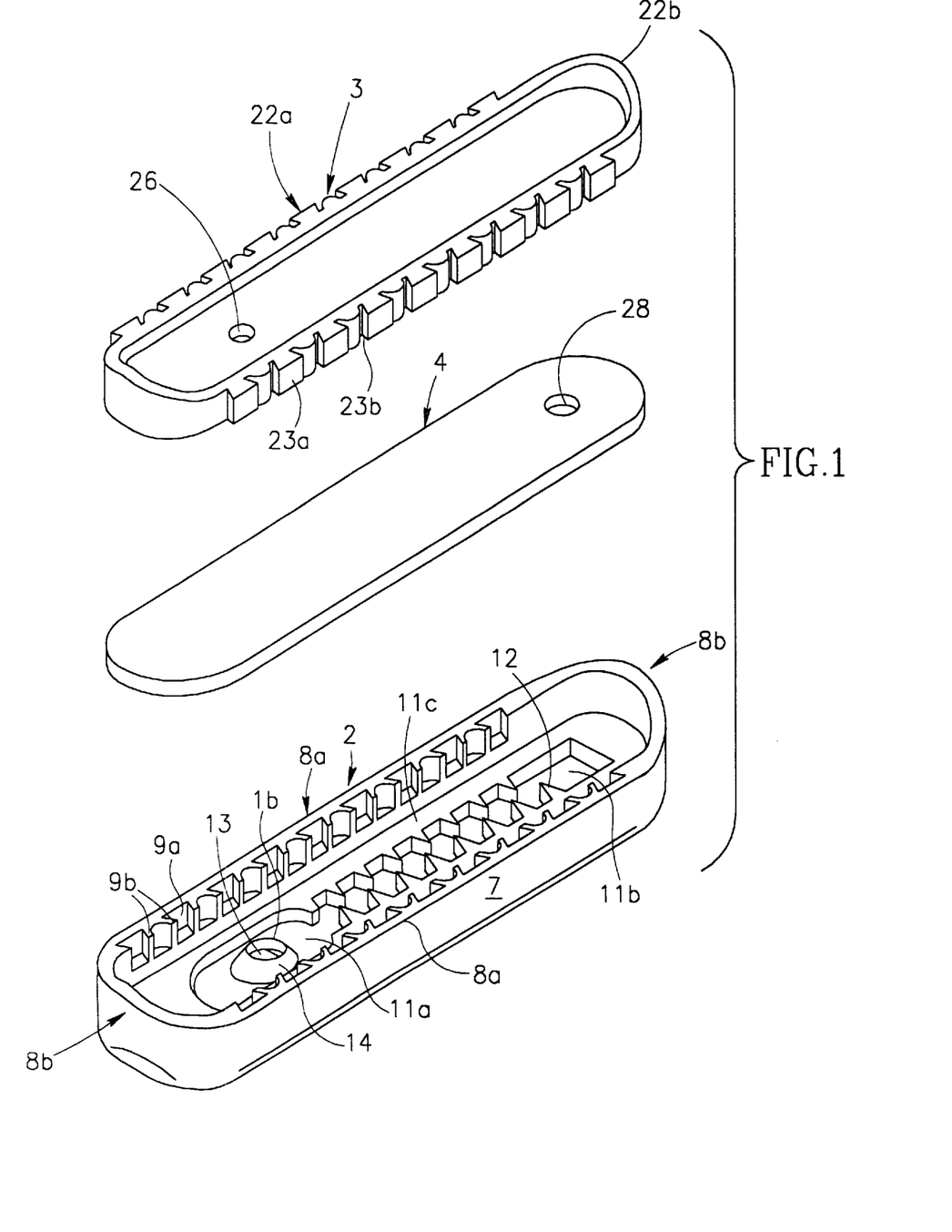
FIG. 1 is an exploded, perspective view of one embodiment of an emitter unit in accordance with the present invention.
Figure 2:
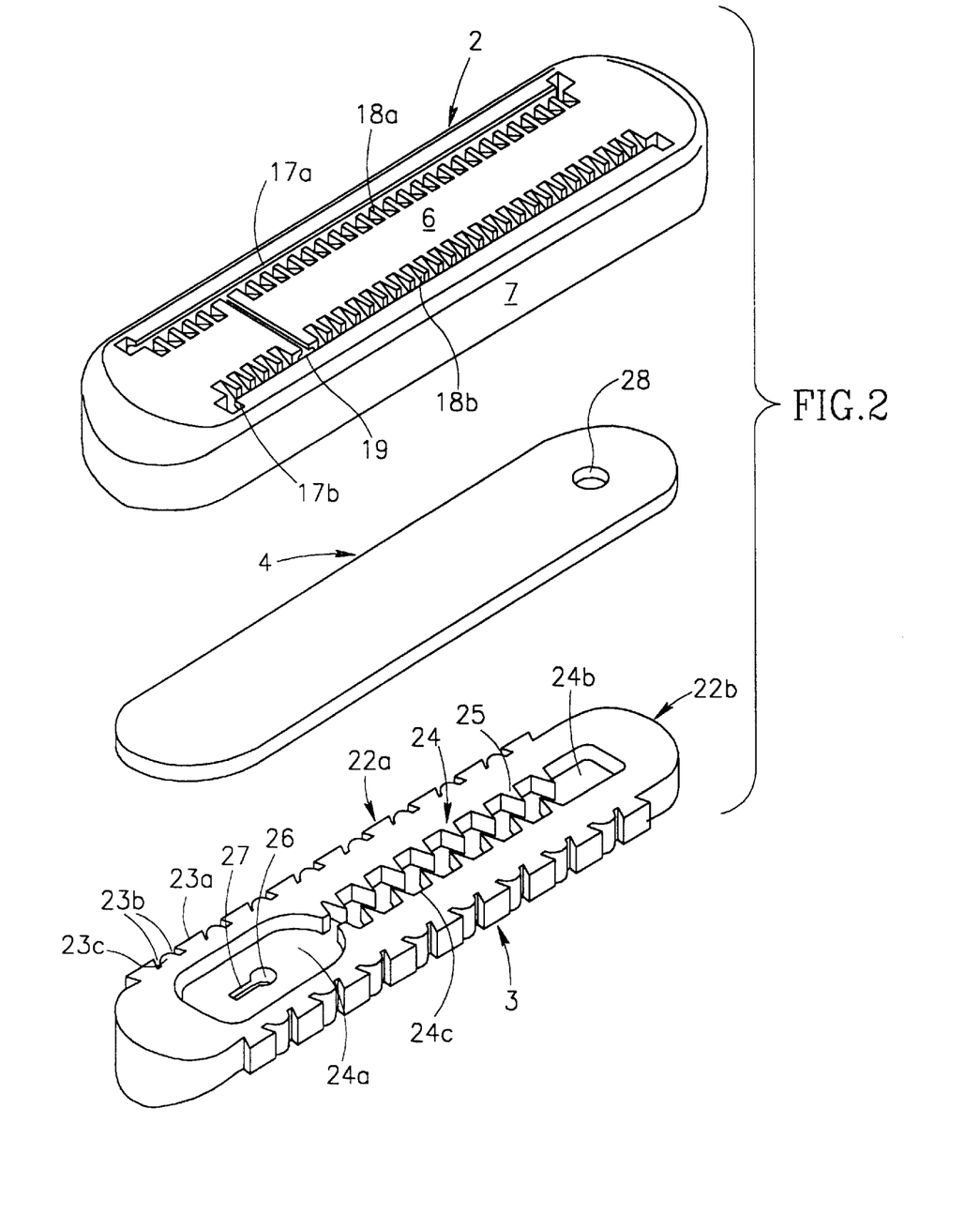
FIG. 2 is an exploded, perspective view of the emitter unit in accordance with the present invention, shown in an inverted sense with respect to the view shown in FIG. 1.

As seen in FIGS. 1 and 2 of the drawings, the receiving member 2 essentially consists of a substantially planar base wall 6 and a peripheral side wall 7.

The peripheral side wall 7 is formed with a pair of rectilinear, elongated side rim portions 8a and a pair of curved end rim portions 8b.

Formed in each elongated side rim portion 8a is an array of alternating dovetailed shaped recesses 9a and projections 9b. The projections 9b are themselves recessed, thereby imparting resilient flexibility to the defining walls of the projections 9b.

Formed in the inner surface of the base wall 6 of the receiving member 2 is an elongated groove 11 which extends from an inlet end portion 11a (of relatively extended width) to an interim terminal portion 11b via a flow-restricting portion 11c formed in a known manner with a pair of oppositely directed sets of flow-restricting, substantially triangular baffles 12.

An inlet well 13 is formed in the inlet portion 11a, defined by a tapering wall portion 14 having a peripheral well rim 16. This rim 16, as seen clearly in FIGS. 5 and 6 of the drawings, extends from the inner surface of the base wall 6 beyond the baffles 12.

Figure 4:
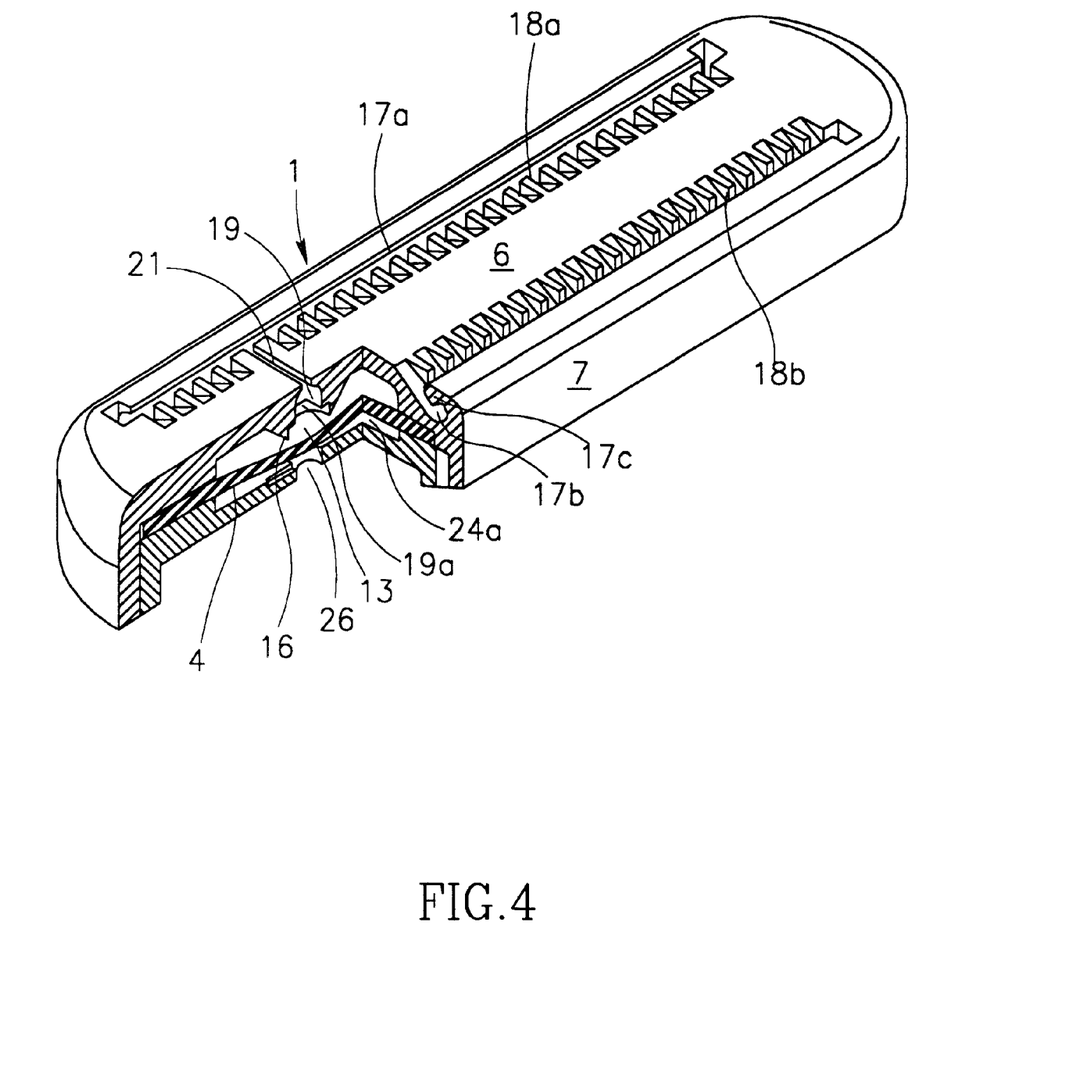
FIG. 4 is a perspective view (inverted with respect to the view shown in FIG. 3) of the emitter unit in accordance with the invention, shown partially cut away.
Figure 7:
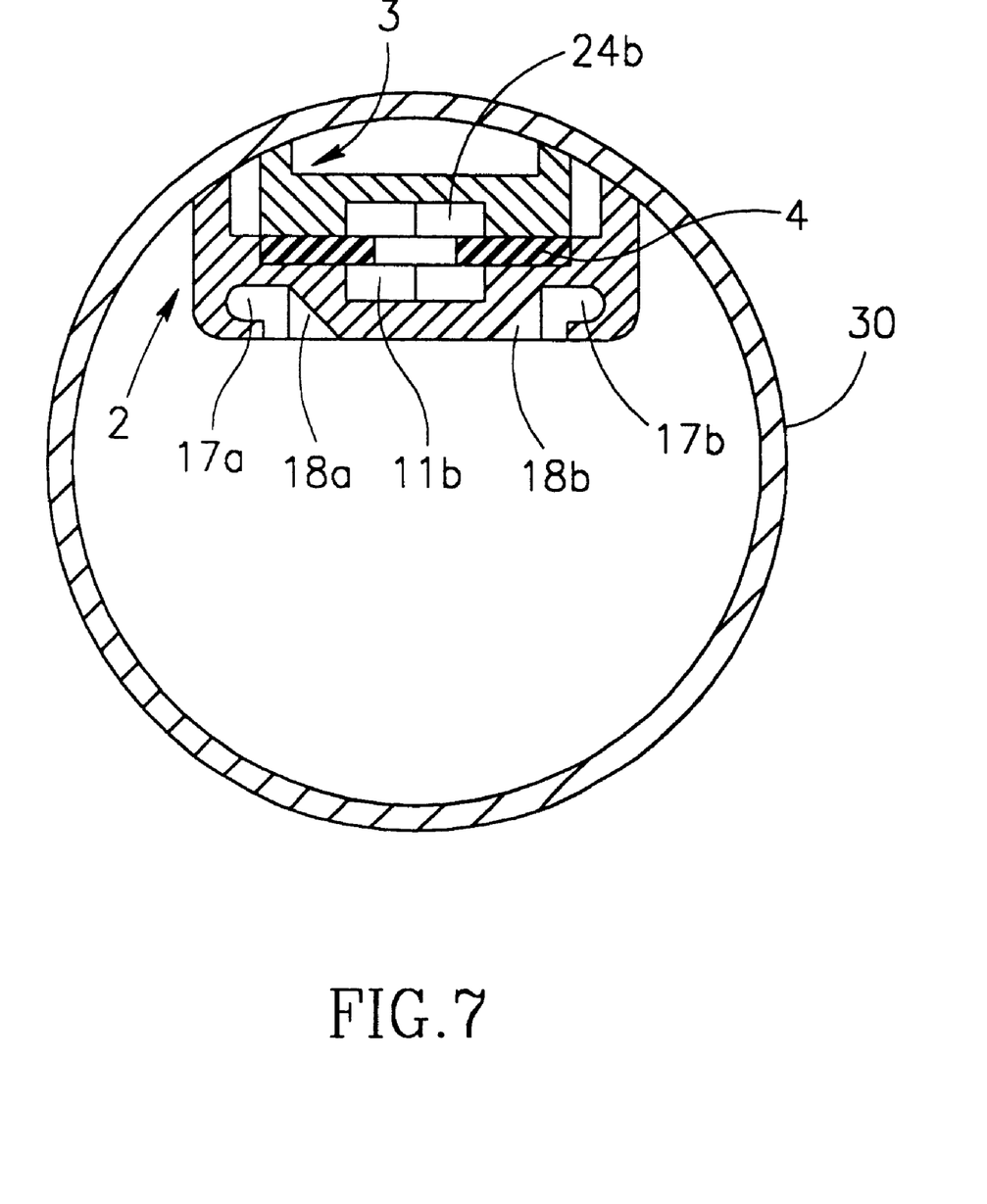
FIG. 7 is a cross-sectional view of the drip irrigation system shown in FIG. 5. taken along the line VII—VII.

Referring now to FIGS. 2, 4 and 7 of the drawings, there are formed in an outer surface of the base wall 6 of the receiving member 2, respectively adjacent the elongated edges thereof, a pair of elongated inflow channels 17a and 17b, having respective arrays of filter baffles 18a and 18b located along the lengths thereof. Formed in the base wall 6 of the receiving member 2 is a transversely directed coupling channel 19 which serves to effect communication between the elongated inflow channels 17a and 17b. The coupling channel 19 communicates via a central aperture 19a with the well 13. Thus, the elongated inflow channels 17a and 17b all debouch via the coupling channel 19 into the central aperture 19a and therefore constitute the sole source of inflow into the emitter unit. A transversely directed narrow molding slot 21 is formed in the upper surface of the base wall 6 of the receiving member 2 and communicates along its length with the coupling channel 19.

As can be seen, particularly in FIGS. 4 and 7 of the drawings, the elongated inflow channels 17a and 17b (which are formed during the molding of the receiving member 2) are formed with a partial covering 17c. In this way there are facilitated the provision of a relatively restricted filtering type inlet into the channels 17a, 17b and, at the same time, allowing for the provision of relatively widely dimensioned channels 17a, 17b.

The cover member 3 is formed with elongated rectilinear side rim portions 22a and curved end rim portions 22b.

Formed along the length of each elongated side rim portion 22a is an array of alternating projections 23a and recesses 23b of dovetailed cross-sectional shape. Each recess 23b has formed, projecting from its base, a semi-cylindrical stud 23c.

The projections and recesses 23a and 23b correspond in shape and dimensions with the recesses and projections 9a and 9b so that the projections 23a, 9b are capable of being press fitted and firmly retained within the recesses 23b, 9a.

The provision of the recessed projection 9b on either side of the defining walls of the recess 9a allows for relative flexibility of these walls upon insertion of the projections 23a therein. The studs 23c effectively fit the recesses formed in the projections 9b.

Formed on an inner surface of the cover member 3 is an elongated groove 24 corresponding in shape and dimensions with the groove 11. In this case, the groove is formed with a downstream terminal portion of extended dimensions and constituting a recess 24a which corresponds in size and dimensions with the inlet portion 11a formed in the receiving member 2. The groove 24 is furthermore formed with an interim inlet portion 24b corresponding in shape and dimensions with the interim terminal portion 11b of the groove formed in the receiving member 2. Finally, the groove 24 comprises an elongated, flow-restricting portion 24c corresponding in shape and dimensions with the flow-restricting groove portion 11c formed in the receiving member 2 and, like that flow-restricting groove portion, is formed with flow-restricting baffles 25. Formed in the base of the recess 24*a* is a recess outlet 26 which extends through the cover member 3. A narrow blind groove 27 is formed in the base wall of the recess 24*a* and communicates with the recess outlet 26.

Figure 5:
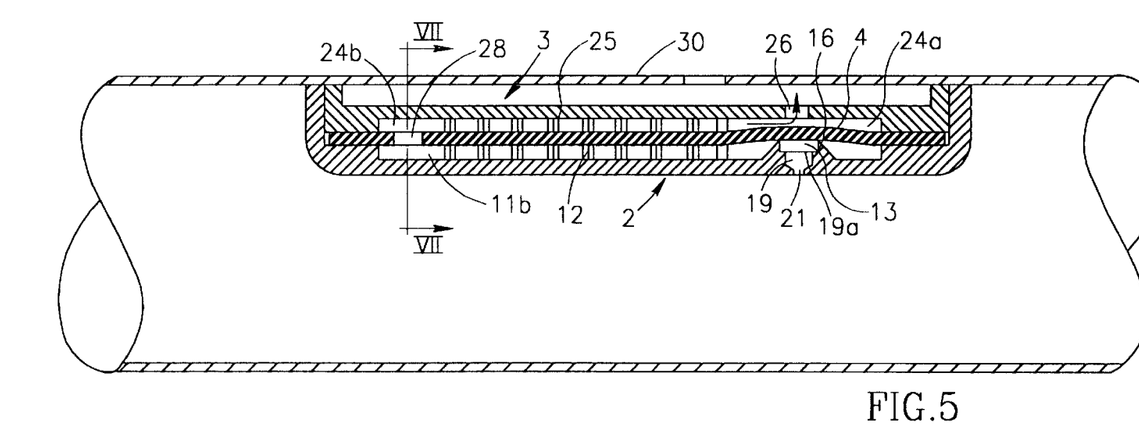
FIG. 5 is a longitudinally-sectioned view of a drip irrigation system incorporating the emitter unit in accordance with the present invention, in an initial stage of operation.
Figure 6:
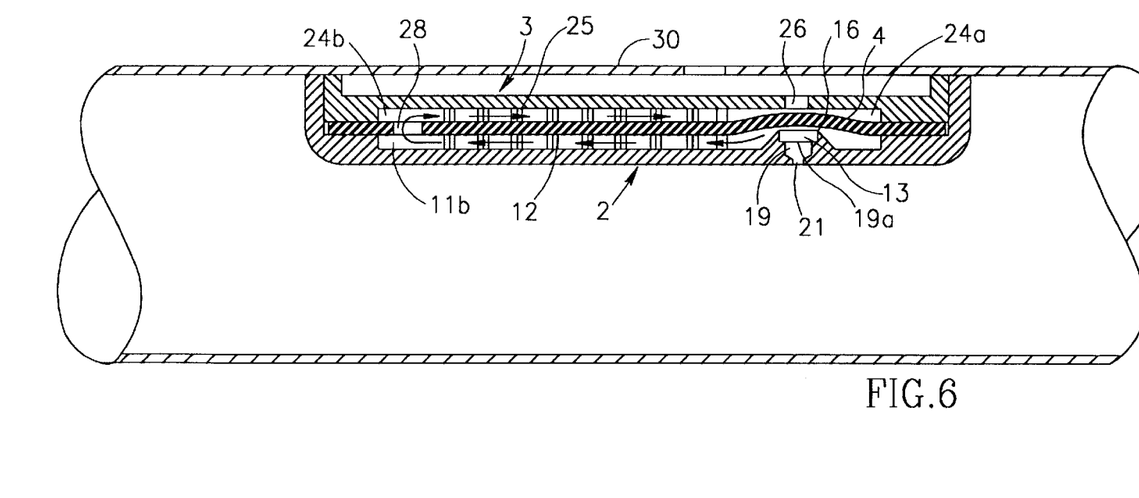
FIG. 6 is a longitudinally-sectioned view of a drip irrigation system incorporating the emitter unit in accordance with the present invention, in a subsequent stage of operation.

The elongated, resiliently flexible membrane 4 corresponds in size and dimensions with the inner surface of the receiving member 2 and is formed with a communicating aperture 28 designed, in the assembled emitter unit, as clearly seen in FIGS. 5, 6 and 7 of the drawings, to be located between the interim terminal portion 11*b* of the groove 11 and the interim inlet portion 24*b* of the groove 24 in the cover member 3.

Assembly of the emitter unit 1 is effected by inserting the membrane 4 into the receiving member 2 and by press fitting the cover member 3 into the receiving member 2, whereby the projections 23*a* and 9*b* are firmly and frictionally fitted and retained within the recesses 9*a* and 23*b*.

As can be seen in FIG. 6 of the drawings, when assembled, the membrane 4 is biasingly pressed against the peripheral well rim 16, thereby effectively sealing the emitter unit against return flow or leakage from the outlet 26 to the inlet to the emitter 19, 19*a*. In this way, the emitter is formed with an effective non-return valve structure. Opening of the valve so as to allow for flow of water into the emitter via the inlets 19, 19*a* is only possible when the inflow pressure is sufficient to displace the membrane 4 away from the well rim 16.

The thus assembled emitter unit 1 can thereafter be stored for subsequent insertion and bonding to a conduit during the extrusion thereof, for example in accordance with the process as described and illustrated in our earlier U.S. Pat. No. 5,324,371.

The means employed to secure the cover member 3 within the receiving member 2, whereby the extended surfaces of the projections 23*a*, 9*b* ensure that the recesses 9*a*, 23*b* are in pressed frictional contact, rendering the disassembly of the units during storage, and during the insertion and bonding process, extremely unlikely.

It will be noted that in the preferred embodiment just described, each projection interengaging means 23*a*, 9*b* is at its narrowest adjacent the rim portion 22*a*, 8*a* of the members 3, 2 from which they respectively extend and widens out towards the rim portions 8*a*, 22*a* of the other members 2, 3 whilst each recess interengaging means 9*a*, 23*b* is at its widest adjacent the rim portion 8*a*, 22*a* of the members 2, 3 in which they are formed and narrows down towards the rim portion 22*a*, 8*a* of the other member 3, 2. By virtue of this construction, and the fact that both the projections and the recesses extend normally to the longitudinal axes of the members 2 and 3, the members are effectively secured against possible separating forces directed transversely to the longitudinal axes. Furthermore, the extended surfaces of the projections on the one hand, and the recesses, on the other hand, ensures effective frictional retention of the projections within the recesses against outward displacement of the members 2, 3 with respect to each other.

Whilst in the specific example illustrated and described the projections 23*a* and recesses 9*a* are shown as being essentially dovetailed in shape, other essentially equivalent shapes can also be utilized. Thus, for example, Ω-shaped projections and recesses can be employed.

Furthermore, adequate retention can in some instances be ensured with a single pair of interengaging projections and recesses, as well as with such projections and recesses of essentially parallel-walled construction.

As seen in FIGS. 5, 6 and 7 of the drawings, the emitter unit 1 is bonded to the inner surface of a conduit 29 precisely at the inter-engaged rim portions 8 and 22 of the receiving and cover members 2 and 3, and this act of bonding permanently secures the members 2 and 3 together and ensures their sealing attachment to each other and to the conduit 30.

Reference will now be made to FIGS. 4, 5, 6 and 7 of the drawings for an explanation of the mode of operation of a drip irrigation system incorporating the emitter unit 1 just described and illustrated.

Irrigation water flowing through the conduit 30 passes through the filtering inflow channels 17*a* and 17*b* and the molding slot 21 and via the coupling channel 19 and central aperture 19*a* into the well 13. The pressure of the inflowing water displaces the membrane 4 from its biased, sealing position on the peripheral well rim 16 (as seen in FIGS. 4 and 6), allowing for the flow of water in the direction of the arrows shown in FIG. 6 through a flow-restricting flowpath defined between the membrane 4 and the flow-restricting groove 11*c* into the interim terminal groove portion 11*b*. The water then passes via the communicating aperture 28 into the inlet groove portion 24*b*, through the elongated, flow-restricting flowpath defined between the membrane 4 and the groove portion 24*c*, and into the recess 24*a*.

Water emerges from the recess 24*a* via the recess outlet 26, having undergone extended flow-rate restriction in the flow-resisting flowpath, so as to emerge as a pressureless drip.

The membrane 4, which bears on the rim of the recess 24*a*, defines with the recess 24*a* an effective outlet control chamber with one surface of the membrane 4 being exposed to the inlet flow pressure, and the opposite surface of the membrane 4 being exposed to the flow pressure in the outlet control chamber.

Thus, there is effected differential pressure control whereby, when the fluid inflow pressure exerted on said first surface of the membrane 4 exceeds the fluid pressure in the outlet control chamber by a predetermined amount, the membrane 4 flexes towards the recess outlet 26 so as to define with a recess outlet a restricted outflow path. Such differential pressure control, as applied to irrigation emitter units, has been previously described, e.g. in the '287 Patent.

It will be understood that with emitter units in accordance with the present invention, the use of the box-like housing allows for the provision of the double-layered and therefore particularly elongated, flow-restricting, flowpaths. Such long, flow-restricting flowpaths have width dimensions which are significantly greater than those which could be employed with emitter units of conventional construction, and this, of course, is of considerable importance in minimizing the dangers of blockage of the flowpaths by grit, or the like.

It will be appreciated however, that the invention is equally applicable to emitter units having only a single flow-restricting layer. Similarly, the invention is equally applicable to emitter units wherein the, or each, flow-restricting layer has more than one flow-restricting flowpath.

Whilst the invention has been specifically described with reference to the use of the membrane so as to achieve differential pressure control, it will be understood that the invention is equally applicable to emitter units employing differing forms of flow control and wherein the membrane serves to define with the internal housing walls the flow restricting flowpath and also to interact therewith so as to provide effective flow control.

Furthermore, whilst the application of the invention has been specifically described in the context of the bonding of the emitter units to an extruded conduit during the extrusion process, the invention is equally applicable to the bonding of the emitter units in accordance with the invention to an inner surface of a conduit strip blank which is then subsequently welded at its longitudinal edges so as to form the conduit.

Furthermore, the utilization of the relatively substantial wall of the receiving member 2 for the provision of filtering inflow channels again allows for the use of inflow paths which are relatively larger in width than those of conventional emitter units, here again minimizing the dangers of blockage.

This is of particular significance where, as in the emitter unit specifically described and illustrated, a non-return valve construction is provided for. With such a construction, only a single restricted inlet 19,19a into the emitter unit is available, and such a restricted inlet could not accommodate adequate filtering means. Such means are therefore provided for by means of the filtering inflow channels rendered possible by the construction of the emitter unit in accordance with the invention.

What is claimed is:

1. An emitter unit adapted to be integrally bonded to an internal surface of a conduit, comprising an elongated housing; a housing inlet adapted to communicate with an interior of said conduit; a housing outlet adapted to communicate with a conduit outlet; an elongated, flow-restricting flowpath formed in said housing; a flowpath inlet communicating with said housing inlet; a flowpath outlet communicating with said housing outlet; a resiliently flexible membrane mounted in said housing; said housing being of closed box-like shape and constituted by an assembly of a receiving member and a cover member; said receiving and cover members being elongated in the direction of their longitudinal axes extending along the length of the conduit, and having projection and recess interengaging means formed in rim portions of said members, said projection and recess means having interacting walls directed substantially transversely to the circumference of said rim portions, such that projection means of one member are adapted to form a close pressure fit within corresponding recess means of the other member.

2. An emitter unit according to claim 1, wherein said members are provided with a plurality of said projection and recess interengaging means.

3. An emitter unit according to claim 2 wherein successive projection and recess interengaging means are arranged in arrays.

4. An emitter unit according to claim 1, wherein said membrane is mounted in said housing so as to overlie and interengage with at least a portion of said flowpath.

5. An emitter unit according to claim 1, wherein said membrane is adapted to restrict outflow.

6. An emitter unit according to claim 1, wherein said walls interact when said housing is assembled.

7. An emitter unit according to claim 1, wherein said walls are directed transversely to the circumference of said rim portions, as seen in a direction of assembly of said members.

8. An emitter unit according to claim 1, wherein said walls are directed transversely to said longitudinal axes, as seen in a direction of assembly of said members.

9. An emitter unit according to claim 1, wherein each projection interengaging means is at its narrowest adjacent the circumference of the rim portion of the member from which it extends and widens out towards the rim portion of the other member whilst each recess interengaging means is at its widest adjacent the circumference of the rim portion of the member in which it is formed and narrows down towards the rim portion of the other member.

10. An emitter unit according to claim 9, wherein each recess interengaging means has formed adjacent thereto a recessed, resilient projection interengaging means.

11. An emitter unit according to claim 1, wherein said projection means and corresponding recess means are of substantially dovetailed shape.

12. An emitter unit according to claim 1, wherein there is formed in said housing a recess having a recess outlet formed in a recess base, said recess having a rim of area substantially greater than the area of said recess outlet and being of extended dimensions as compared with the width of the flowpath; a first surface of the membrane adapted to be exposed to fluid inflow pressure; a second and opposite surface of said membrane being juxtaposed to said rim so as to be pressed against said rim under said inflow pressure; and so as to define with said recess an outlet control chamber; the arrangement being such that when said fluid inflow pressure exceeds the fluid pressure in said outlet control chamber by a predetermined amount, the membrane flexes towards said recess outlet so as to define with a recess outlet a restricted outflow path.

13. An emitter unit according to claim 12 wherein there are formed in the inner surfaces of both said members elongated grooves which together with said membrane respectively define component flow restricting flowpaths which communicate via a communicating aperture formed in said membrane, said flowpath inlet is associated with a first of said grooves, said flowpath outlet is associated with a second of said grooves, said housing inlet is formed in a first of said members, said housing outlet and said recess are formed in a second of said members, and said communicating aperture is formed in said membrane adjacent to a downstream end of said first groove and an upstream end of said second groove.

14. An emitter unit according to claim 1 or 12, wherein there is formed in an inner surface of at least one of said members an elongated groove which together with the membrane defines said flow restricting flowpath.

15. An emitter unit according to claim 1 or 12, wherein there are formed in the inner surfaces of both said members elongated grooves which together with said membrane respectively define component flow restricting flowpaths which communicate via a communicating aperture formed in said membrane.

16. An emitter unit according to claim 15, wherein said grooves are formed with a pair of oppositely directed arrays of flow restricting baffles.

17. An emitter unit according to claim 1, wherein said housing inlet includes an inlet well projecting into said housing and having a peripheral well rim against which said membrane is normally sealingly biased, the arrangement being such that a predetermined minimum fluid inflow pressure bearing on said membrane is effective in displacing the membrane from its sealing engagement with the well rim.

18. An emitter unit according to claim 1, wherein there is formed adjacent at least one elongated edge of one of said members in an outer surface thereof an elongated inflow channel communicating with said housing inlet, adapted to be exposed to the interior of the conduit and having an array of filter baffles located along the length thereof.

19. An emitter unit according to claim 18, wherein a pair of said elongated inflow channels are respectively formed adjacent the opposite elongated edges of said one member.

20. An emitter unit according to claim 19, wherein said inflow channels all debouch into said housing inlet.

21. An emitter unit according to claim 19, wherein said inflow channels are partially covered.

22. An emitter unit according to claim 18, wherein the or each elongated inflow channel is formed in the outer surface of the receiving member.

23. A drip irrigation system comprising an irrigation conduit and at least one bonded emitter unit according to claim 1.

24. An emitter unit adapted to be integrally bonded to an internal surface of a conduit comprising a housing having a housing inlet and a housing outlet; a partially covered elongated inflow channel formed in an outer surface of said housing adapted to be exposed to the interior of the conduit and extending therealong, said inflow channel communicating with said housing inlet; said housing outlet adapted to communicate with a conduit outlet.

25. An emitter unit according to claim 24, wherein a plurality of partially covered inflow channels are formed in spaced apart locations of said outer surface, and wherein a communication channel is formed in said outer surface transversely directed with respect to said inflow channels and in which is formed said housing inlet whereby water flow in said inflow channels debouches into said housing inlet.

26. An emitter unit according to claim 25, wherein said partially covered inflow channels are formed by an undercut molding process.

27. An emitter unit according to claim 24, further comprising filter elements formed in said outer surface of the housing and communicating with said inflow channel.

28. An emitter unit according to claim 27, wherein said filter elements are an array of filter baffles formed along the length of the inflow channel.

* * * * *